United States Patent [19]

Brower

[11] 4,008,540
[45] Feb. 22, 1977

[54] INSULATED FISHING CREEL

[76] Inventor: Jerrold J. Brower, 319 W. Riverside Ave., Kellogg, Idaho 83837

[22] Filed: Nov. 13, 1975

[21] Appl. No.: 631,486

[52] U.S. Cl. .............................................. 43/55
[51] Int. Cl.² ..................................... A01K 97/04
[58] Field of Search ............ 43/55, 56, 57; 62/457; 220/334, 339, 337; 224/5 G

[56] References Cited

UNITED STATES PATENTS

| | | | |
|---|---|---|---|
| 1,580,474 | 4/1926 | Eckenbrecht | 43/55 |
| 2,885,819 | 5/1959 | Newell et al. | 43/55 |
| 2,899,103 | 8/1959 | Ebert | 43/55 |
| 3,225,983 | 12/1965 | Majka | 43/55 |
| 3,728,812 | 4/1973 | Woolworth et al. | 43/56 |

*Primary Examiner*—Warner H. Camp
*Attorney, Agent, or Firm*—Wells, St. John & Roberts

[57] ABSTRACT

An insulated fishing creel is constructed of urethane foam insulating material including a hollow container and a lid hinged thereon to form a thoroughly insulated enclosure. The lid includes an opening formed therethrough that is normally closed by a spring hinged door. The torsion spring connected to the hinged door is utilized to continuously urge the door to a closed position sealing the creel interior. Also provided are: a hinge for the lid, a creel handle, and a carrying strap mounting means, all formed integrally from a flexible material. A lid fastening assembly is also included to selectively hold the lid in a closed position.

7 Claims, 7 Drawing Figures

U.S. Patent  Feb. 22, 1977  4,008,540
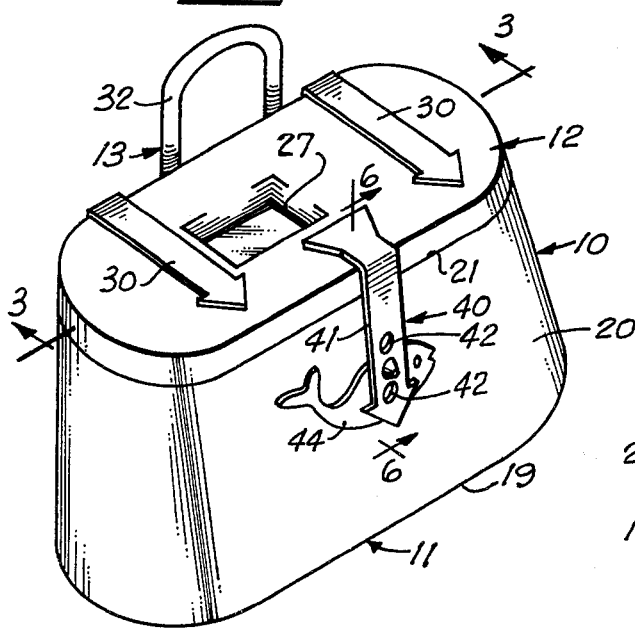
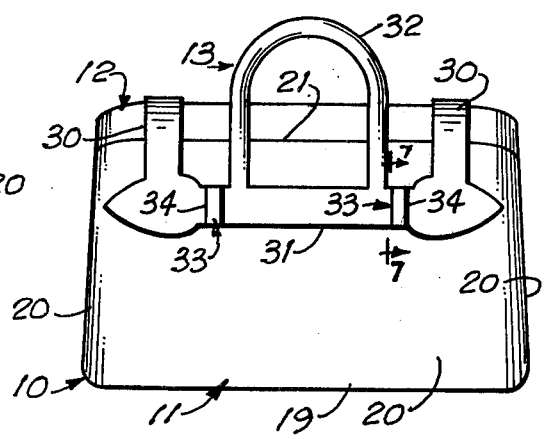
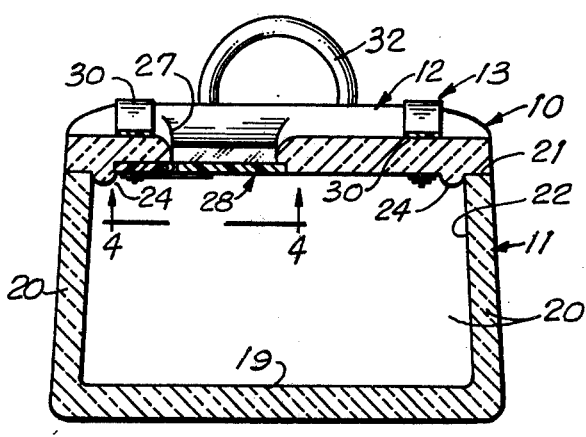
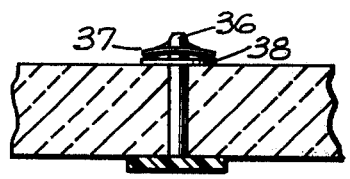
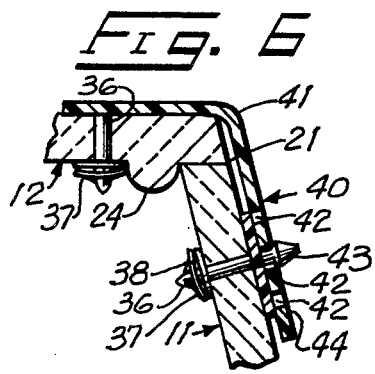
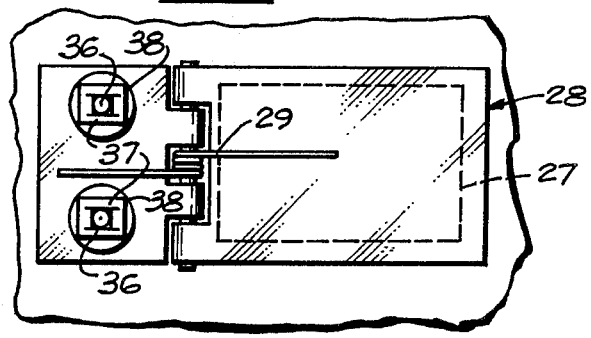
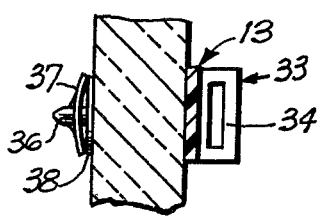

INSULATED FISHING CREEL

BACKGROUND OF THE INVENTION

The present invention relates to fishing creels and more specifically to creels formed of insulated material for the purpose of preserving fish.

Fishing creels have been utilized probably since the sport of stream fishing originated. Since a stream fisherman usually moves about on foot, he must have some form of container to hold the fish he catches. Most conventional creels however are not heat insulated and therefore allow the fish to soften and deteriorate as time passes. To the contrary, such creels are often formed of wicker and are open to the outside air and temperature. It is therefore desirable to obtain some form of creel that would provide an insulated enclosure whereby fish may be held within a cool atmosphere.

U.S. Pat. No. 3,364,615 discloses a fishing creel that is molded out of lightweight foam type plastic that is claimed to provide buoyancy to the creel and, due to its insulating qualities, maintain fish held therein in a fresh condition. The lid for this cooler includes an opening that will allow air to freely enter and leave the confines of the creel. No door is provided to close the lid opening.

U.S. Pat. No. 3,225,983 discloses a combination fishing creel and portable cooler. A canvas covered box is included, having a removable lid. The lid further includes a recess covered by a closure member. The closure is held down by an elastic strap and may be separated from the lid without removing the lid from the container. In operation the fisherman must lift the closure member upwardly away from the lid and hold it with one hand while inserting the fish through the opening with his other hand. Often, however, one of the fisherman's hands is already occupied holding a fishing rod.

It is an object of the present invention to provide an insulated fishing creel that will maintain freshness of caught fish over relatively long periods of time.

It is another important object to provide such a creel that permits easy access to the creel interior without exposing the interior to the outside air for any extended period of time and requires use of only one hand for operation.

Another object is to provide such a creel that may be carried by hand, on a user's belt, or on a shoulder strap.

These and still further objects and advantages will become apparent upon reading the following disclosure, which, taken with the accompanying drawings, discloses a preferred form of the present invention. It is to be noted however that this description and the attached drawings are given only by way of example to illustrate a preferred form of my invention and that other forms may be devised by those skilled in the art to which the invention pertains. Therefore, only the claims attached at the end of this specification are given to define and place restrictions on the scope of my invention.

BRIEF DESCRIPTION OF THE DRAWINGS

A preferred form of the present invention is illustrated in the accompanying drawings in which:

FIG. 1 is a pictorial view of the present fishing creel;

FIG. 2 is an elevational view of the backside of the present creel;

FIG. 3 is a section view taken along line 3—3 in FIG. 1;

FIG. 4 is an enlarged fragmentary view taken substantially along line 4—4 in FIG. 3;

FIG. 5 is a fragmentary section view showing an enlarged form of a typical fastening member utilized with the present invention;

FIG. 6 is a fragmentary section view taken along line 6—6 in FIG. 1; and

FIG. 7 is an enlarged fragmentary section taken along line 7—7 in FIG. 2.

DETAILED DESCRIPTION OF A PREFERRED EMBODIMENT

A fishing creel comprising a preferred form of the present invention is illustrated in the accompanying drawings and designated therein by the reference character 10. Basically, the creel 10 includes a hollow body or container 11 covered by a hinged lid 12. The lid 12 is movably mounted to the container body 11 by a hinge and handle means 13.

More specifically, the container 11 includes a horizontal bottom wall 19 that is joined on four sides by upright side walls 20. The bottom wall 19 and side walls 20 define three sides of an enclosure 22 that is utilized to receive freshly caught fish. The walls 19 and 20 are formed of a urethane foam insulating material that provides excellent heat insulation properties.

Walls 19 and 20 extend upwardly from the integral bottom wall 19 to a top edge 21. Edge 21 is flat and formed along a single horizontal plane. This edge 21 releasably engages lid 12 to complete the enclosure 22.

Lid 12 is also formed of a urethane foam insulating material identical to that utilized to construct the walls 19 and 20. Lid 12 further includes an outwardly projecting bead 24 that extends about the inside periphery of edge 21. This bead 24 may be seen in particular detail in FIGS. 3 and 6. Bead 24 is molded integrally with the remainder of lid 12 and is designed to fit in direct contact with the walls 20 in order to seal the enclosure 22 to prevent free exchange of air from within enclosure 22 with outside air.

Lid 12 includes an opening 27 that would normally openly communicate with the enclosure 22. Opening 27 however is closed by a door 28. Door 28 is hinged and mounted to the inside surface of lid 12. The door is hinged so it will swing inwardly and includes a torsion spring 29 (FIG. 4) that continuously urges door 28 to a closed condition completely overlapping opening 27. The door 28 will remain in a closed condition until forced open by the user's hand. This may be accomplished by the same hand that presently also holds a fish. The user may simply press the fish against the door to force it open. After a fish has been received in the enclosure 22, the door 28 will automatically close to seal the creel interior area.

The hinge and handle means 13 is shown in substantial detail in FIG. 2. It may be noted in FIG. 2 that the hinge and handle means 13 is comprised of a spaced pair of hinged straps 30, and integral hinge base plate 31, (FIG. 2), a handle 32, and strap mounting means 33. This entire structure is formed of a single piece of molded polyurethane plastic. The plastic is sufficiently flexible to act as a hinge support for lid 12 while also providing means by which the creel may be hand held or otherwise suspended from the fisherman's body.

Strap mounting means 33 is shown in detail by FIG. 7 of the drawing. Means 33 is simply comprised of a pair of eyelets 34 that are integrally formed with the remainder of the hinge and handle means 13. The eyelets 34 loosely receive a shoulder mounting strap (not shown) or, may be attached to a belt in order that the creel be supported on the fisherman's body rather than being hand held.

The hinge and handle means 13 is connected to the relatively thick walls 20 and lid 12 by a plurality of pins 36 and threadless nuts 37. FIG. 5 illustrates a typical arrangement for one such pin 36 and nut 37. The pin 36 is formed integrally with its attached structure and includes sufficient length to protrude through the entire thickness of an appropriate wall 19, 20 or lid 12. The portion of a pin 36 projecting through the material receives a washer 38 and threadless nut 37. Nuts 37, rather than utilizing a threaded engagement with pins 36, simply grip the pin and oppose movement in an outward disengaging direction. Such nuts 37 are commonly utilized with plastic fastening assemblies.

A releasable fastening means 40 is illustrated in detail in FIGS. 1 and 6. Means 40 includes a flexible strap 41 that is mounted by pins 36 and nuts 37 to the lid 12. Strap 41 extends outwardly from lid 12 and is sufficiently flexible to be bent downwardly for engagement with a male snap member 43. Strap 41 is provided with female snap members in the form of apertures 42. Thus, the lid may be selectively closed by simply engaging the strap 41 by snapping together the male and appropriate female snap members 41 and 42. The male snap member 43 is fixed to a forwardly facing side wall 20 of the body 11 by a decorative base 44 shown in the form of a fish.

From the above description of the components of my invention, a more thorough understanding of its operation now becomes apparent. As discussed above, the creel may either be mounted to the fisherman's body by means of a shoulder strap or belt, or the creel 10 may be hand carried through provision of handle 32.

In any case, when it is desired to place a fish within the enclosure 22, the fisherman simply presses open door 28 and inserts the fish therethrough. By utilizing door 28 for this purpose, the fisherman prevents a maximum exchange of air between the enclosure 21 and the outside atmosphere. Also, once the fish has been received within enclosure 22, the door 28 will automatically snap shut. Only one hand is required for this operation since the fish may be pressed against the door to affect its opening rather than holding the door with one hand while inserting the fish with the other.

When it is desired to empty the creel or to insert an extra large fish, the releasable fastening means is operated to unsnap the strap 41 from male member 43. The lid may then be pivoted to an open condition, completely exposing the enclosure 22. The enlarged opening also facilitates cleaning of the creel.

It is preferable that the fisherman place a source of refrigerant such as ice cubes or an enclosed cooling pack, to assure that fish held within enclosure 22 are maintained at a low temperature. It is common knowledge that fresh caught fish will stay in a fresh condition for extended periods of time if they are kept cool.

It is understood that various changes and modifications may have by now become apparent that do not depart from the scope of my invention. Therefore, it is again noted that only the following claims are to be taken as definitions and restrictions upon the scope of my invention.

What I claim is:

1. An insulated fishing creel, comprising:
   an upwardly open container formed of heat insulating material and including upright side walls defining an open container top and joined together about a horizontal bottom wall;
   a container lid also formed of heat insulating material;
   integral flexible hinge and handle means for hingedly connecting the lid to the container to cover the container top and to provide a grip for holding the creel;
   said integral flexible hinge and handle means being attached to the exterior of one of the side walls and extending upward along the side wall and over the container lid and attaching to the container lid;
   an inwardly facing bead extending about an inner surface of the lid for releasable mating engagement with the side walls at the container top to selectively seal the container interior;
   an opening formed through the lid;
   an inwardly swinging hinged door mounted to an inside surface of the lid and overlapping the opening; and
   biasing means for continuously urging the door to a closed condition.

2. The fishing creel as set out by claim 1 further comprising strap mounting means formed integrally with the hinge and handle means for receiving a shoulder strap.

3. The fishing creel as set out by claim 1 further comprising releasable fastening means for selectively holding the lid across the open top container end.

4. The fishing creel as set out by claim 3 wherein the fastening means is comprised of a male snap member mounted to the creel side wall and a complementary female snap member mounted to a flexible strap on the lid.

5. The fishing creel as set out by claim 4 further comprising strap mounting means formed integrally with the hinge and handle means for receiving a shoulder strap.

6. The fishing creel as set out in claim 1 wherein the integral hinge and handle means are attached to the container by a pin and threadless nut arrangement wherein the pin is integral with the hinge and handle means and extends through the container side wall to receive the threadless nut at a free end thereof within the confines of the container.

7. The fishing creel as defined by claim 1 wherein the heat insulation material is foamed urethane plastic.

* * * * *